United States Patent [19]
Kozaki et al.

[11] 4,422,730
[45] Dec. 27, 1983

[54] LIQUID CRYSTAL DISPLAY DEVICE AND THE MANUFACTURING METHOD THEREOF

[75] Inventors: Shuichi Kozaki, Nara; Fumiaki Funada, Yamatokoriyama; Shigehiro Minezaki, Ikoma; Hisashi Uede, Wakayama, all of Japan

[73] Assignee: Sharp Kabushiki Kaisha, Osaka, Japan

[21] Appl. No.: 197,575

[22] Filed: Oct. 16, 1980

[30] Foreign Application Priority Data

Oct. 18, 1979 [JP] Japan .................................. 54-134806
Feb. 27, 1980 [JP] Japan .................................. 55-24403
Feb. 28, 1980 [JP] Japan .................................. 55-24842

[51] Int. Cl.³ ............................................... G02F 1/133
[52] U.S. Cl. ................................. 350/339 R; 350/338
[58] Field of Search ............... 350/339 R, 334, 338, 350/337; 156/650, 652, 653

[56] References Cited

U.S. PATENT DOCUMENTS

| | | |
|---|---|---|
| 3,185,020 | 5/1965 | Thelen ................................ 350/164 |
| 3,256,588 | 6/1966 | Sikini et al. ......................... 156/653 |
| 3,700,306 | 10/1972 | Cartmell et al. ................... 350/341 |
| 3,736,047 | 5/1973 | Gelber et al. ....................... 350/338 |
| 3,876,287 | 4/1975 | Sprokel ............................ 350/336 X |
| 4,248,502 | 2/1981 | Bechteler et al. ......... 350/339 R X |
| 4,321,284 | 3/1982 | Yakushiji ....................... 156/653 X |

*Primary Examiner*—Bruce Y. Arnold
*Assistant Examiner*—David Lewis
*Attorney, Agent, or Firm*—Birch, Stewart, Kolasch & Birch

[57] ABSTRACT

A liquid crystal display device comprises a pair of substrates, a first patterned layer formed on a part of one of the substrates, a second layer formed on the remaining part of the one of the substrates, the thickness of the second layer being substantially identical to that of the first patterned layer to provide a layer uniform in thickness, and a third layer formed on the uniform layer to provide orientation of molecules of a liquid crystal layer disposed between the pair of substrates. The uniform layer is manufactured by the steps of forming the first patterned layer on part of the one of the substrates, and forming the second layer on the remaining part of the one of the substrates, using a lift-off method.

11 Claims, 15 Drawing Figures

LIQUID CRYSTAL DISPLAY DEVICE AND THE MANUFACTURING METHOD THEREOF

BACKGROUND OF THE INVENTION

The present invention relates to a display device and, more particularly, to a liquid crystal display device and the manufacturing method thereof.

In the field of liquid crystal displays, slant evaporation of a thin film of dielectric material was utilized to align the liquid crystal molecules in a direction parallel to planes including two glass plates. However, a shadow appeared adjacent the edge portion of a patterned, transparent, conductive film formed on one of the plates while the slant evaporation was in progress. The slant evaporation method as unable to deposit an alignment film at the shadowed edge portion, resulting in an improper alignment of the liquid crystal molecules thereon.

Therefore, it is desired in the manufacture of liquid crystal displays to avoid the shadowed portion.

The reflective type of twisted nematic liquid crystal display and Guest-Host liquid crystal display, etc. had the problem that the difference in refractive index between the transparent, conductive, patterned film and a transparent, insulating film caused a great quantity of reflected light. The transparent, conductive, patterned film was deposited in a display pattern while the transparent, insulating film was kept in contact with the transparent, conductive, patterned film. A great quantity of light was reflected in the interface between them.

This led to a problem that the display pattern appeared as if it had been floated. There was another problem that the display pattern was relatively unclear with poor constant, when a certain voltage was applied between two of the transparent, conductive films.

Therefore, it is further desired to eliminate these problems with the liquid crystal displays, in particular, those of the reflective type.

SUMMARY OF THE INVENTION

Accordingly, it is an object of the present invention to eliminate the above described problems in the manufacture of a liquid crystal display.

It is a further object of the present invention to provide an improved liquid crystal display having a uniform orientation of liquid crystal molecules and the manufacturing method thereof.

It is a further object of the present invention to provide an improved liquid crystal display having a layer of uniform thickness to be formed on one of the plates by the conventional slant evaporation, thereby insuring uniform deposition by the evaporation, and a method for manufacturing the liquid crystal display as described above.

It is a further object of the present invention to provide an improved liquid crystal display comprising a uniform layer, formed on one of the plates, of at least two discrete layers having substantially the same refractive index, and its manufacture method thereof.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a liquid crystal display device comprises a pair of substrates, a first patterned layer formed on a part of one of the substrates, a second layer formed on the remaining part of the one substrate, the thickness of the second layer being substantially identical to that of the first patterned layer to provide a uniform layer in thickness, and a third layer formed on the uniform layer to provide orientation of molecules of a liquid crystal layer disposed between the pair of substrates.

The uniform layer is manufactured by the steps of forming the first patterned layer on a part of one of the substrates, and forming the second layer on the remaining part of the same substrate, using a lift-off method.

DESCRIPTION OF THE INVENTION

Figure 3:
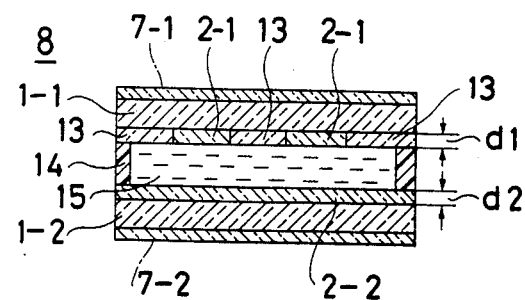
FIGS. 3, 4 and 5 show side views of the liquid crystal display of the present invention.
Figure 4:
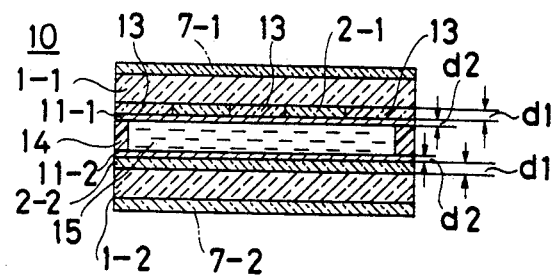
Figure 5:
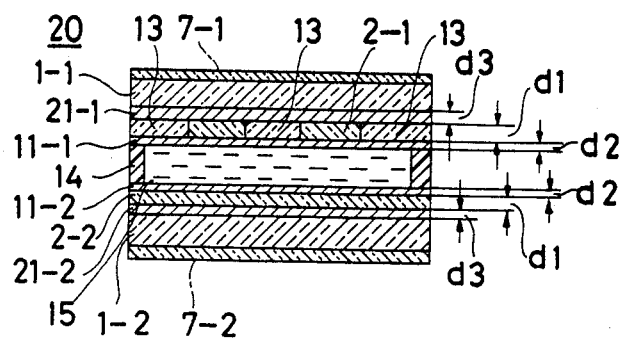

Prior to the detailed description of the present invention, the applicability of various embodiments of the present invention will be briefly described. An embodiment of the present invention as disclosed in FIGS. 1(a) through 1(d) and FIGS. 2(a) through 2(h) can be adapted to any type of liquid crystal display including the reflective type and light transmission type. Further, preferably, another embodiment of the present invention as disclosed in FIGS. 3 through 5, is limited to the reflective type of liquid crystal displays such as the twisted nematic liquid crystal display and the Guest-Host liquid crystal display, from the nature of the invention. The light transmission type of liquid crystal display can comprise a structure as set forth in FIGS. 3 through 5, but this is not mandatory.

Referring now to FIGS. 1(a) through 1(d), there are illustrated side views of a plate adapted to form a liquid crystal display of the present invention.

Figure 1A:
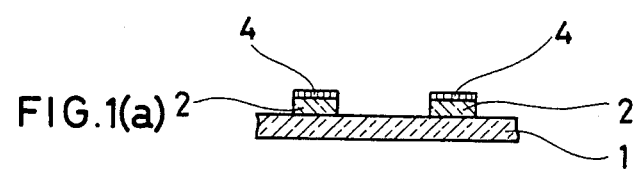
FIGS. 1(a), 1(b), 1(c) and 1(d) show side views of a plate adapted for a liquid crystal display made in accordance with the principle of the present invention.

On a substrate, preferably glass, in FIG. 1(a), there are formed a transparent, conductive, patterned film 2 and a layer 4 to be removed by etching. The layer 4 is thereafter subjected to a selective etching technique. They are desirably patterned to make a predetermined display pattern.

Figure 1B:
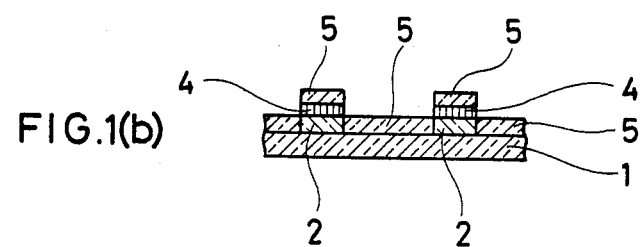
Figure 1C:
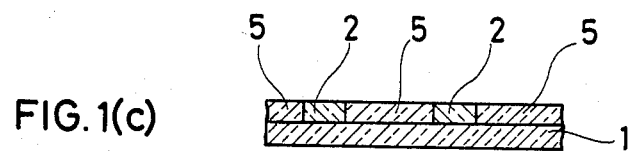

In FIG. 1(b), there is formed a transparent, insulating layer 5, the thickness of which is substantially similar to that of the transparent, conductive film 2, over the entire surface of the substrate 1 and the layer 4. In FIG. 1(c), the two layers of the layer 4 and the insulating layer 5 thereon are removed using the selective etching technique. This procedure is called lift-off method. Accordingly, there is formed a layer of uniform thickness consisting of the conductive layer 2 and the insulating layer 5, over the entire surface of the substrate 1.

Figure 1D:
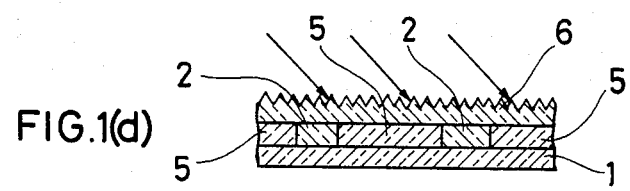

In FIG. 1(d), there is applied by slant evaporation with the use of SiO, etc. another transparent, insulating layer 6 over the entire surface of the layer of uniform thickness. Thus, a uniform orientation layer 6 is deposited to orient molecules of a liquid crystal mixture.

Two supporting plates of this kind are prepared and then combined with each other, in such a manner that the liquid crystal molecules at each surface are at right angles to each other to complete the twisted nematic liquid crystal display.

Figure 2A:
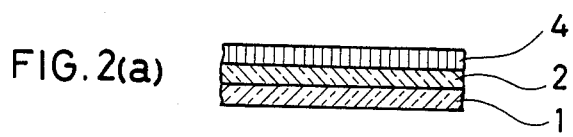
FIGS. 2(a), 2(b), 2(c), 2(d), 2(e), 2(f), 2(g) and 2(h) show more specific side views of the plate for the liquid crystal display of the present invention.
Figure 2B:
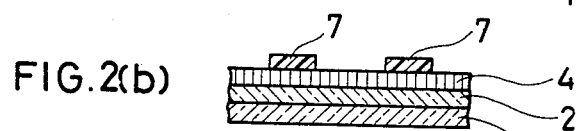
Figure 2C:
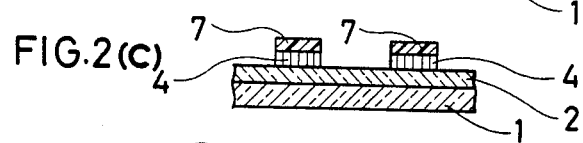
Figure 2D:
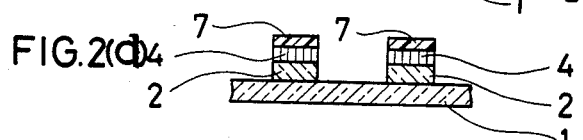

Referring now to FIGS. 2(a) through 2(h), a specific example of the present invention is illustrated as follows:

(1) As viewed from FIG. 2(a), there are prepared the substrate 1 made of soda glass, the transparent, conductive film 2, and the layer 4. The evaporated, conductive film 2 comprises $In_2O_3$ with an amount of about 5.0 weight % of $SnO_2$ and a thickness of about 500 Å. The evaporated layer 4 also comprises Au at a thickness of about 500 Å.

(2) A photo resist, for example, AZ-1350 produced by Shipley Company Inc., is coated over the entire surface of the layer 4. The conventional exposure and development techniques are applied to produce a photosensitive synthetic resin layer 7 which is desirably patterned, as viewed from FIG. 2(b).

(3) The synthetic resin layer 7 is used as an etching mask. An etchant is prepared by the procedure in which ammonium iodide of about 8.0 g and iodine of about 2.0 g are dissolved in a solution composed of about 20 CC of ethanol and about 30 CC of water. Such an etchant can dissolve Au but can not dissolve $In_2O_3$. Using this etchant, as viewed from FIG. 2(c), the etching layer 4 not covered with the synthetic resin layer 7 thereon is removed.

(4) Further, the synthetic resin layer 7 is used as the etching mask. Another kind of etchant is prepared which contains ferric chloride and hydrochloric acid in an equivalent ratio. This kind of etchant is used to etch and remove the conductive film 2 of $In_2O_3$, not covered with the synthetic resin layer 7 thereon, as viewed from FIG. 2(d).

Figure 2E:
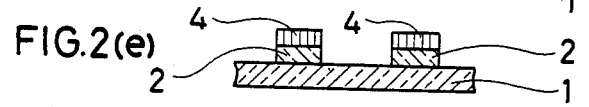

(5) As shown in FIG. 2(e), the synthetic resin layer 7 is removed in an appropriate solution.

Figure 2F:
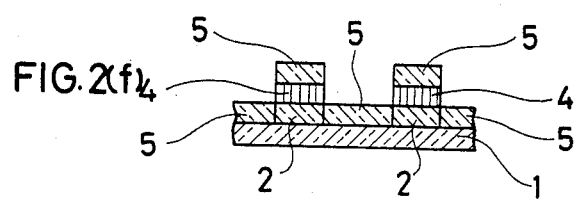

(6) As shown in FIG. 2(f), there is formed the transparent, insulating layer 5 over the entire surface of the conductive layer 2, the layer 4, and the substrate 1. The selected material of the insulating layer 5 may be $SiO_2$ or $Nb_2O_5$, etc. The thickness of the insulating layer 5 is about 500 Å. At the same time, preferably, the substrate 1 is heated to about 350° C. such that the bonding between the substrate 1 and the insulating layer 5 is improved.

Figure 2G:
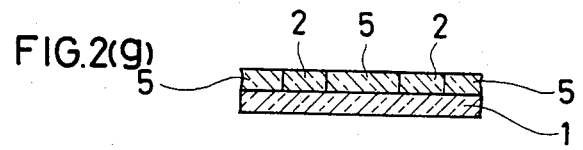
Figure 2H:
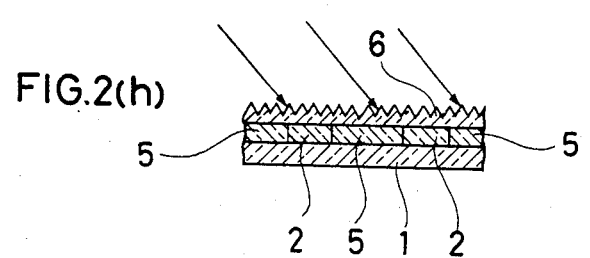

(7) The whole element as shown in FIG. 2(f) is dipped into the etchant to dissolve the Au as described in the above item (3). Accordingly, the layer 4 and the insulating layer 5 disposed thereon are removed as indicated in FIG. 2(g).

(8) Formed on the substrate 1, is a layer of uniform thickness consisting of the conductive, patterned layer 2 and the insulating layer 5. Slant evaporation is carried out on the entire surface of the layer of uniform thickness. Preferably, the slant evaporation is carried out under the condition that the incident angle of evaporated particles is about 60°. There is formed another transparent, insulating layer 6 of a thickness of about 50 Å, comprising SiO over the entire surface of the uniform layer.

Referring now to FIGS. 3, 4 and 5, there are illustrated side views of a specific example of a liquid crystal display according to the present invention.

With reference to FIG. 3, there are provided a pair of transparent substrates 1-1 and 1-2, the uniform-thickness layer consisting of the transparent, conductive, patterned layer 2-1 and the transparent, insulating layer 13, the transparent, conductive layer 2-2, a liquid crystal layer 15, a pair of spacers 14, and a pair of polarizers 7-1 and 7-2.

A selected material of the transparent substrates 1-1 and 1-2 may be soda glass. The uniform-thickness layer consisting of the conductive, patterned layer 2-1 and the insulating layer 13 is formed on the transparent substrate 1-1. The uniform-thickness layer is formed by the manufacturing steps as described with FIGS. 2(a) through 2(h). Each of the conductive, patterned layer 2-1 and that insulating layer 13 has a similar thickness of d1, say, about 300 Å. Each of them has a similar refractive index $n_1$. Preferably, the material of the conductive, patterned layer 2-1 may be $In_2O_3$ with an amount of about 5.0 weight % of $SnO_2$ and a refractive index of about 1.9. The material of the insulating layer 13 may be $Nb_2O_5$ with a refractive index of about 1.9.

On the transparent substrate 1-2, there is formed the transparent, conductive layer 2-2 which is commonly opposite to the conductive, patterned layer 2-1. The thickness of the conductive layer 2—2 is about 300 Å.

The conventional rubbing technique or slant evaporation with a thin film of dielectric material is applied over the conductive layer 2-2, and the uniform-thickness layer consisting of the conductive layer 2-1 and the insulating layer 13, in order to align the liquid crystal molecules.

The spacers 14 are provided to bind the pair of the transparent substrates 1-1 and 1-2 with a proper spacing. The liquid crystal layer 15 is disposed between the uniform-thickness layer and the conductive layer 2-2. The liquid crystal may be nematic liquid crystal, or Guest-Host type liquid crystal material.

In the twisted nematic liquid crystal display, the liquid crystal molecules in the liquid crystal layer 15 are twisted at right angles between the orientation films, respectively, disposed on the conductive layer 2-2 and the uniformly thick layer. Further, each of the polarizers 7-1 and 7-2 is attached to each of the external surfaces of the transparent substrates 1-1 and 1-2.

The plane of polarization of the polarizer 7-1 attached to the transparent substrate 1-1 is perpendicular to the molecular orientation direction of the uniform-thickness layer consisting of the conductive layer 2-1 and the insulating layer 13 positioned on the transparent 1-1. The plane of polarization of the polarizer 7-2 attached to the transparent substrate 1-2 is perpendicular to the molecular orientation direction of the conductive layer 2-2 positioned on the transparent substrate 1-2.

As a result, the plane of polarization of the plarizer 7-1 is perpendicular to the longitudinal axes of the liquid crystal molecules at the side of the uniform-thickness layer disposed on the transparent substrate 1-1. The plane of polarization of the polarizer 7-2 is perpendicular to the longitudinal axes of the liquid crystal molecules at the side of the conductive layer 2-2 disposed on the transparent substrate 1-2.

The above described twisted nematic liquid crystal display 8 is operated in which case the display pattern specified by the conductive layer 2-1 appears clear and does not appear to float.

A liquid crystal display 10 of FIG. 4 is identical to the display 8 with the exception that each of the transparent, insulating layers 11-1 and 11-2 is disposed on each of the uniform-thickness layer on the transparent substrate 1-1 and the conductive layer 2-2 on the transparent substrate 1-2. The thickness of each of the insulating layers 11-1 and 11-2 is $d_2$. The refractive index is $n_2$. The surface of it is subjected to the rubbing techniques or the slant evaporation with a thin film of a dielectric material.

The layers 1-1, 1-2, 2-1, 2-2, 13, 15, 11-1 and 11-2 within the liquid crystal display 10 maintain the following relation (I):

$$n_1 \cdot d_1 \simeq n_2 \cdot d_2 \simeq \lambda/4$$

$$n_1^2 \cdot n_4 \simeq n_0 \cdot n_2^2 \qquad (I)$$

where
- $\lambda$: the wavelength of a light applied to the display cell 10 for visibility
- $n_4$: the refractive index of the liquid crystal layer 15

The relation (I) indicates a boundary condition providing the minimum component of a reflected light at a boundary between the transparent substrate 1-1 and the uniform-thickness layer consisting of the conductive layer 2-1 and the insulating layer 13, another boundary between the transparent substrate 1-2 and the conductive layer 2-2, and a further boundary between the liquid crystal layer 15 and each of the insulating layer 11-1 and the insulating layer 11-2. The relation (I) is obtained by a theoritical calculation.

The relation (I) is satisfied according to the following conditions:
- $\lambda$: 5,500 Å which provides the maximum visibility in view of the visibility curve obtained by an experiment
- $n_1$: 1.9 where each of the conductive layers 2-1 and 2-2 comprises $In_2O_3$ with the addition of $S_nO_2$ of about 5.0 weight % and the insulating layer 13 comprises $Nb_2O_5$
- $d_1$: 700 Å for the layers 2-1, 13 and 2-2
- $n_0$: 1.55 where each of the transparent substrates 1-1 and 1-2 comprises soda glass
- the liquid crystal layer 15:
    - a liquid crystal mixture ROTN 403 (produced by Hoffmann La Roche Inc.)
- $n_2$: 1.9 where each of the insulating layer 11-1 and 11-2 comprises $Nb_2O_5$
- $d_2$: 700 Å
- $n_4$: 1.52

The rubbing technique or the slant evaporation with a thin film of a dielectric material is applied to each of the insulating layers 11-1 and 11-2 in order to provide the twisted nematic liquid crystal display.

The plane of polarization of each of the polarizers 7-1 and 7-2 is perpendicular to the molecular orientation direction of each of the insulating layers 11-1 and 11-2.

The thus composed twisted nematic liquid crystal display 10 is operated in which case the display pattern specified by the conductive layer 2-1 appears clear and does not appear to float. It is believed that strong reflective light is eliminated at a boundary between the transparent substrate 1-1 and the uniform-thickness layer consisting of the conductive layer 2-1 and the insulating layer 13, another boundary between the transparent substrate 1-2 and the conductive layer 2-2, and a further boundary between the crystal layer 15 and each of the insulating layer 11-1 and the insulating layer 11-2.

A further specific liquid crystal display 20 of FIG. 5 is identical to the same 10 of FIG. 4 with the exception that there are interposed further transparent, insulating layers 21-1 and 21-2, respectively, between the transparent substrate 1-1 and the uniform-thickness layer consisting of the conductive layer 2-1 and the insulating layer 13, and between the transparent substrate 1-2 and the conductive layer 2-2. The thickness of each of the insulating layers 21-1 and 21-2 is $d_3$. The refractive index is $n_3$.

The rubbing technique or the slant evaporation with a thin film of a dielectric material is applied to each of the insulating layers 11-1 and 11-2 in order to provide the twisted nematic liquid crystal display. The plane of polarization of each of the polarizers 7-1 and 7-2 is perpendicular to the molecular orientation direction of each of the insulating layers 11-1 and 11-2.

As a result, the direction of polarization of a light through each of the polarizers 7-1 and 7-2 is perpendicular to each of the logitudinal axis of the liquid crystal molecules in contact with each of the insulating layer 11-1 and 11-2.

The layers 1-1, 1-2, 2-1, 2-2, 13, 15, 11-1, 11-2, 21-1, and 21-2 within the liquid crystal display 20 maintain the following relation (II):

$$n_1 \cdot d_1 \simeq n_2 \cdot d_2 \simeq n_3 \cdot d_3 \simeq \lambda/4$$

$$n_0 \cdot n_1^2 \cdot n_4 \simeq n_2^2 \cdot n_3^2 \qquad (II)$$

The relation (II) indicates another boundary condition providing the minimum component of reflected light at a boundary between the transparent substrate 1-1 and the insulating layer 21-1, another boundary between the insulating layer 21-1 and the uniform-thickness layer consisting of the conductive layer 2-1 and the insulating layer 13, a further boundary between the transparent substrate 1-2 and the insulating layer 21-2, a further boundary between the insulating layer 21-2 and the insulating layer 21-2 and the conductive layer 2-2, and a further boundary between the liquid crystal layer 15 and each of the insulating layers 11-1 and 11-2. The relation (II) is also obtained by the theoritical calculation.

The relation (II) is satisfied according to the following conditions:

$\lambda$: 5,500 Å the liquid crystal layers 15:
- a liquid crystal mixture ROTN 403 (produced by Hoffmann La Roche Inc.).
- $n_4$: 1.52
- $n_0$: 1.55 where each of the transparent substrates 1-1 and 1-2 comprises soda glass
- $n_3$: 1.97 where each of the insulating layers 21-1 and 21-2 comprises $Bi_2O_3$
- $d_3$: 700 Å
- $n_1$: 1.9 where each of the conductive layers 2-1 and 2-2 comprises $In_2O_3$ with the addition of $SnO_2$ of about 5.0 weight % and the insulating layer 13 comprises $Nb_2O_5$
- $d_1$: 700 Å
- $n_2$: 1.47 where each of the insulating layers 11-1 and 11-2 comprises $SiO_2$
- $d_2$: 900 Å

The twisted nematic liquid crystal display 20 may be completed by causing the rubbing or the slant evaporation with a thin film of a dielectric material on each of the insulating layers 11-1 and 11-2.

The thus composed twisted nematic liquid crystal display 20 is operated in which case the display pattern specified by the conductive layer 2-1 appears clear and does not appear to float. It is also believed that strong reflective light is eliminated at the above described boundaries.

By virtue of provision of the insulating layers 21-1 and 21-2 each having a desirable refractive index $n_3$ and a thickness $d_3$, a wide selection of the material of each of the insulating layers 11-1 and 11-2 is enabled. The rubbing or the slant evaporation is applied to each of the insulating layers 11-1 and 11-2 in contact with the liquid crystal layer 15, in order to align the logitudinal axes of the liquid crystal moleculars.

While only certain embodiments of the present invention have been described, it will be apparent to those skilled in the art that various changes and modifications may be made therein without departing from the spirit and scope of the invention as claimed.

What is claimed is:

1. A method for making a liquid crystal display device comprising the steps of:
   providing a pair of substrates;
   forming a first patterned layer on a part of one of the substrates;
   forming a second layer on the remaining part of one of the substrates, the thickness of the second layer being substantially identical to that of the first patterned layer to provide a uniform layer in thickness;
   forming an additional layer on the uniform layer; and
   disposing a liquid crystal layer between the pair of substrates.

2. The method of claim 1, wherein each of the pair of substrates is transparent.

3. The method of claim 1, further comprising the steps of:
   forming a third layer on the entire surface of one of the substrates, the third layer maturing the first patterned layer;
   forming an etching layer on the entire surface of the third layer;
   forming a photo resist layer on a selected portion of the etching layer;
   removing the remaining portion except for the selected portion of the etching layer by etching the etching layer;
   removing the remaining portion of the selected portion of the third layer by etching the third layer to provide the first patterned layer;
   removing the photo resist layer;
   forming a fourth layer on the entire surface of the etching layer remaining and portions of the one of the substrates free of the first patterned layer thereon, the thickness of the fourth layer being identical to the first patterned layer;
   removing the etching layer and the fourth layer thereon by etching them, in order to provide a uniform layer in thickness consisting of the first patterned layer and the fourth layer; and
   forming a fifth layer on the entire surface of the uniform layer to provide orientation of molecules of a liquid crystal layer interposed between the pair of substrates.

4. The method of claim 1, wherein the first patterned layer comprises $In_2O_3$.

5. The method of claim 1, wherein the second layer comprises an insulating layer.

6. The method of claim 1, wherein the etching layer comprises Au.

7. The method of claim 5, wherein the second layer comprises $SiO_2$.

8. A liquid crystal display prepared by the method of claim 3 or 4.

9. A liquid crystal display device comprising:
   a pair of substrates;
   a first patterned layer formed on a part of one of the substrates;
   a second layer formed on the remaining part of one of the substrates, the thickness of the second layer being substantially identical to that of the first patterned layer to provide a uniform layer in thickness, and the refractive index of the first patterned layer being substantially identical to that of the second layer;
   a third layer formed on the uniform layer to provide orientation of molecules of a liquid crystal layer interposed between the pair of substrates;
   a fourth layer interposed between the uniform layer and the liquid crystal layer; and
   wherein the following relation is satisfied:

$$n_1 \cdot d_1 \simeq n_2 \cdot d_2 \simeq (\lambda/4)$$

$$n_1^2 \cdot n_4 \simeq n_0 \cdot n_2^2$$

where
   $n_1$: the refractive index of each of the first patterned layer and the second layer
   $d_1$: the thickness of each of the first patterned layer and the second layer
   $n_2$: the refractive index of the fourth layer
   $d_2$: the thickness of the fourth layer
   $\lambda$: the wavelength of a radiation applied to the display,
   $n_4$: the refractive index of the liquid crystal layer,
   $n_0$: the refractive index of each of the substrates.

10. A liquid crystal display device comprising:
    a pair of substrates;
    a first patterned layer formed on a part of one of the substrates;
    a second layer formed on the remaining part of one of the substrates, the thickness of the second layer being substantially identical to that of the first patterned layer to provide a uniform layer in thickness, and the refractive index of the first patterned layer being substantially identical to that of the second layer;
    a third layer formed on the uniform layer to provide orientation of molecules of a liquid crystal layer interposed between the pair of substrates;
    a fifth layer interposed between the uniform layer and one of the substrates; and
    wherein the following relation is satisfied:

$$n_1 \cdot d_1 \simeq n_2 \cdot d_2 \simeq n_3 \cdot d_3 \simeq (\lambda/4)$$

$$n_0 \cdot n_1^2 \cdot n_4 \simeq n_2^2 \cdot n_3^2$$

where
    $n_1$: the refractive index of each of the first patterned layer and the second layer
    $d_1$: the thickness of each of the first patterned layer and the second layer
    $n_2$: the refractive index of the fourth layer
    $d_2$: the thickness of the fourth layer
    $\lambda$: the wavelength of a radiation applied to the display
    $n_4$: the refractive index of the liquid crystal layer $n_3$: the refractive index of the fifth layer
$d_3$: the thickness of the fifth layer, and
$n_0$: the refractive index of each of the substrates.

11. The device of claim 9 or 10, wherein the first patterned layer comprises $In_2O_3$ with the addition of $SnO_2$, the second layer comprises $Nb_2O_5$, the thickness of each of the first patterned layer and the second layer being about 700 Å, each of the pair of substrates comprises soda glass, the fourth layer comprises $Nb_2O_5$ where the thickness is about 700 Å, or $SiO_2$ where the thickness is about 900 Å, the refractive index of the liquid crystal layer is 1.52, the fifth layer comprises $Bi_2O_3$ where the thickness is about 700 Å, and the wavelength of the radiation is made about 5,500 Å.

* * * * *